US005517883A

United States Patent [19]

Göldi et al.

[11] Patent Number: 5,517,883

[45] Date of Patent: May 21, 1996

[54] FASTENING ELEMENT AS WELL AS DEVICE TO SCREW IN SAID FASTENING ELEMENT

[75] Inventors: Michael Göldi, Alstätten; Thomas A. Schmidheini, Balgach, both of Switzerland

[73] Assignee: SFS Stadler Holding AG, Heerbrugg, Switzerland

[21] Appl. No.: 410,563

[22] Filed: Mar. 23, 1995

Related U.S. Application Data

[63] Continuation of Ser. No. 68,391, May 28, 1993, abandoned.

[30] Foreign Application Priority Data

Nov. 23, 1992 [DE] Germany .......................... 42 39 339.6

[51] Int. Cl.[6] ............................ B25B 23/02; F16B 35/00

[52] U.S. Cl. ................................ 81/57.37; 81/44; 81/125; 411/368

[58] Field of Search ............................ 81/44, 487, 57.37, 81/125, 435, 434, 431, 433; 411/368, 533

[56] References Cited

U.S. PATENT DOCUMENTS

| | | | |
|---|---|---|---|
| 2,782,822 | 2/1957 | Clark | 81/125 X |
| 3,707,894 | 1/1973 | Stillwagon, Jr. | 81/125 |
| 4,781,503 | 11/1988 | Bögel | 411/368 |
| 4,809,568 | 3/1989 | DeCaro . | |

FOREIGN PATENT DOCUMENTS

| | | |
|---|---|---|
| 4991 | 11/1988 | Germany . |
| 4208824 | 11/1992 | Germany . |
| 615722 | 2/1980 | Switzerland . |

*Primary Examiner*—D. S. Meislin
*Attorney, Agent, or Firm*—Helfgott & Karas

[57] ABSTRACT

The invention pertains to a fastening element consisting of a screw (5) and a metallic washer (6) to attach insulation sheeting, and possibly additional waterproof sheeting onto a solid substructure, whereby the screw is provided with a drill tip (7), a shaft (9) with threads (8), and a screw head (10). The washer is provided with a central aperture (12), whereby this aperture (12) is smaller than the outer diameter of the thread, but at least equally as large as the core diameter of the threaded area of the shaft (9). The washer (6) is at a distance from the screw head (10) preassembled in such a way that it is secured against axial movement in the threaded area of the shaft (9) (FIG. 3).

3 Claims, 2 Drawing Sheets

FASTENING ELEMENT AS WELL AS DEVICE TO SCREW IN SAID FASTENING ELEMENT

This is a continuation, of application Ser. No. 08/068, 391, filed May 28, 1993 now abandoned.

BACKGROUND OF THE INVENTION

The invention pertains to a fastening element consisting of a screw and a large-surface metallic washer to attach insulation sheeting or insulation plates, and possibly additional waterproof sheeting onto a solid substructure, whereby the screw is provided with a drill tip, a shaft with a thread that extends over at least part of its length, and a screw head. The washer is provided with a preferably central aperture in order to insert the screw shaft.

The invention also pertains to a device to screw in such a fastening element. Said device has a support surface for the washer as well as a receptacle tube to insert the end of the screw at which the screw head is located, whereby the receptacle tube is additionally constructed as a receptacle for an axially movable and rotatable tool to take hold of the screw head.

Fastening elements of the previously mentioned type are known in many different variations (for example, U.S. Pat. No. 4,781,503 or EP-A-0283184). One of the purposes of these fastening elements is securely retaining a large-surface washer against axial movement in the immediate area of the screw head or a threadless shaft section located directly beneath the screw head. This measure is intended to yield a certain degree of safety against loads, for example, from people walking on the insulation sheeting or the waterproof sheeting applied on top of said insulation sheeting during utilization of such fastening elements on roof surfaces; in other words, the screw head's penetration towards the outside through the waterproof sheeting should be prevented if such a load is applied. One known variation utilizes a plastic disk as the large-surface washer. The plastic disk is braced against a peripheral collar arranged on the screw shaft. A different variation utilizes a metallic washer which is braced against the end of the threaded section provided on the side at which the screw head is located.

Another document (U.S. Pat. No. 4,809,568) introduced a fastening element and a device designed to screw in said fastening element, whereby this known element consists of a screw and a plastic washer. The washer has an extended hub in its central area, which means in the area of an aperture provided for the insertion of the screw shaft so that the wall of the aperture adjoins the screw threads over a relatively long section. The fact that the screw [sic] may be pushed over the thread similar to a fitting and remain in this position in preassembled condition until the final mounting process is made possible by the correspondingly small dimensions of the aperture in the washer.

However, it is in practical applications not always possible to utilize plastic washers, in particular in those sections of a roof where a subsequent waterproofing is performed by means of a flaming process. It is an absolute requirement that large-surface metallic washers be utilized in such instances. In order to facilitate the preassembly of the washer and the screw, namely, at a correspondingly large distance from the screw head, it was attempted to inject a plastic part into a larger central aperture whereby the injected plastic part adjoins the screw over a certain threaded area viewed in axial direction, thus making preassembly in the form of a fitting possible. However, it was soon established that such an additional arrangement of a central plastic part in a metallic washer is connected with very high costs, thus representing a very disadvantageous factor for mass produced articles.

In order to be able to screw in such fastening elements with a practical hand tool, it must be ensured that the large-surface washer is fixed on the screw shaft at a correspondingly large distance from the screw head because an axial alignment of the screw should be obtained while screwing in the fastening element. This axial alignment is obtained by means of the screw head engaging into the tool on the one hand, and by means of guiding the screw in the aperture of the washer on the other hand, so that at least a two-point guidance exists until the tip of the screw penetrates the solid substructure.

SUMMARY OF THE INVENTION

This invention is based on the objective to create a fastening element consisting of a screw and a metallic washer which is optimally suitable for these special applications. The invention additionally pertains to a device which, for the purpose of screwing in such a fastening element, also provides a retention for said fastening elements after the insertion into the device because no elastic parts are present due to the utilization of a metallic washer.

According to the invention, this objective is attained by a fastening element which is characterized by the fact that the aperture in the washer is smaller than the outer diameter of the thread, but is at least equally as large as the core diameter of the threaded area of the shaft, and that the washer is preassembled in such a way that it is secured against axial movement at a distance from the screw head in the threaded area of the screw shaft. This invention makes it possible that the washer retains itself in the respective axial position on the screw shaft due to the correspondingly small aperture. It is thus solely required to insert the screw into the washer to a sufficient extent during preassembly, so that the washer is located in the proper axial position. The cost for this type of preassembly amounts to a fraction of the cost for an additionally injected central plastic part. It was furthermore established in practical experiments that it is indifferent for the optimal effect of the fastening element if the washer is aligned exactly perpendicular to the axial direction of the screw shaft, or if the washer is somewhat tilted to one or the other direction if loosely engaged with the thread. This type of construction is particularly advantageous if a subsequent roof surface is to be applied by means of a flaming process because no plastic parts are present within the fastening area.

It is furthermore advantageous if the diameter of the aperture at least approximately corresponds with the sum of the core diameter and the height of one thread. If the dimensions are chosen in this manner, the walls of the aperture in the washer are not damaged, and no thread is cut into the walls of said aperture. This measure is also directly associated with the fact that the force required to insert the screw into the washer is very minute. However, despite these facts, a precautionary measure against axial movement is provided because two opposing sections of the aperture wall always adjoin the screw shaft, namely, the core on the one hand, and the crest of one thread on the other. Due to these particular dimensions it is also possible that the washer can lie in a plane that extends exactly perpendicular to the screw axis in the threaded area. Despite the precautionary measure against axial movement, it is not entirely impossible that such a metallic washer will tilt to one or the other side, and is thus situated transverse to the screw axis.

It is particularly practical for the subsequent mounting of mass produced articles if all elements are preassembled in the same manner. It is thus suggested that the preassembly of the washer is executed at an identical distance from the screw head.

The device to screw in the fastening element according to the invention is characterized by the fact that at least one permanent magnet is provided within the area of the support surface for the washer.

This constructive measure has particularly positive effects when utilized in connection with metallic washers consisting of sheet steel. The retention of conventional plastic washers was obtained by corresponding claws because a plastic washer can be slightly deformed in a elastic manner in order to engage behind said claws. Such an elastic deformation is inconceivable when utilizing a metallic washer, for example, a steel washer. The invention thus provides a simple means to retain the washer in the area of the support surface, whereby the screw penetrates the receptacle tube by the corresponding distance due to the precautionary measure against axial movement in the aperture of the washer. It is thus possible to operate such a device on a roof in the same manner as with conventional plastic washers. The screw and the washer are during the mounting process directed downward after the fastening element is inserted into the device, which in other words means that the fastening element would fall out if no retention were provided.

The device is preferably constructed of plastic or a light alloy, and permanent magnets are inserted into two openings that are directed parallel to the axis of the receptacle pipe and radially oppose each other with reference to the receptacle pipe.

Such an arrangement ensures that a washer made of steel adjoins the support surface of the device with its entire surface, and that the washer not only serves to transfer the mounting forces onto the elements to be fastened, but also takes over the required guiding function in association with the screw head which is at first arranged at a corresponding distance from the same.

The fastening element according to the invention and the device according to the invention, both of which may in particular be utilized on the roof area of a house, provide an optimal means to utilize metallic washers, i.e., washers made of steel, and to obtain a cost-effective manufacture of the fastening element as well as optimal efficiency due to the insertion of the fastening elements by means of a machine.

BRIEF DESCRIPTION OF THE DRAWINGS

Additional advantages of the invention are in the following described in detail with the aid of the figures. The figures show.

PREFERRED EMBODIMENTS

Figure 1:
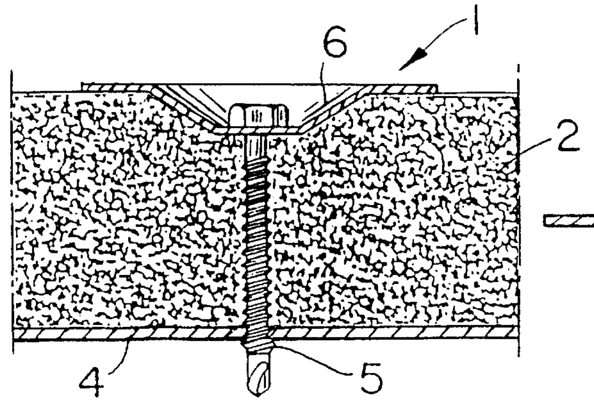
FIG. 1 the utllization of a fastening element during the attachment of insulation sheeting.
Figure 2:
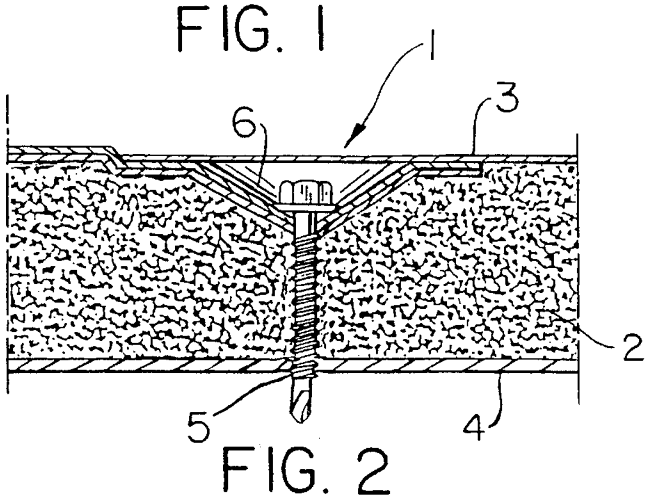
FIG. 2 the utilization of a fastening element during the attachment of insulation sheeting with additional waterproof sheeting.

The fastening element (1) essentially serves for the purpose to attach insulation sheeting (2) or insulation plates (FIG. 1), or insulation sheeting (2) with additional waterproof sheeting (3) onto a solid substructure (4). The fastening element (1) comprises a screw (5) and a large-surface metallic washer (6). The screw (5) has a drill tip (7), a shaft (9) with threads (8) that extend over at least part of its length, and a screw head (10). The threads (8) can basically extend continuously over the entire length of the screw shaft (9), but a threadless shaft section (11) is advantageously provided at least beneath the screw head (10) so that a precautionary measure against loads, which already existed in such arrangements, is additionally enhanced when the washer is under load. It would also be conceivable that the threads (8) extend over a correspondingly smaller distance of the shaft (9). A thread (8) is at least required adjacent to the drill tip (7) in order to facilitate the attachment onto the solid substructure (4). A thread should also be provided in that particular area of the screw shaft (9) in which the washer is braced and secured in axial direction.

The washer (6) has a central aperture (12) which is arranged in the center of a conical depression (13). This depression (13) causes the screw head (10) to be countersunk after the final mounting of the fastening element so that there is no risk of damage to the waterproof sheeting to be applied on top of the insulation sheeting. The washer illustrated from a top view in this figure is approximately square and has rounded edges. It would naturally also be conceivable to apply the measures according to the invention to washers of different shapes. It is of no consequence if the surface of the washer is smooth or is provided with corresponding reinforcement ribs or depressions. The arrangement according to the invention is also possible if the washer is curved for the purpose of reinforcement.

Figure 3:
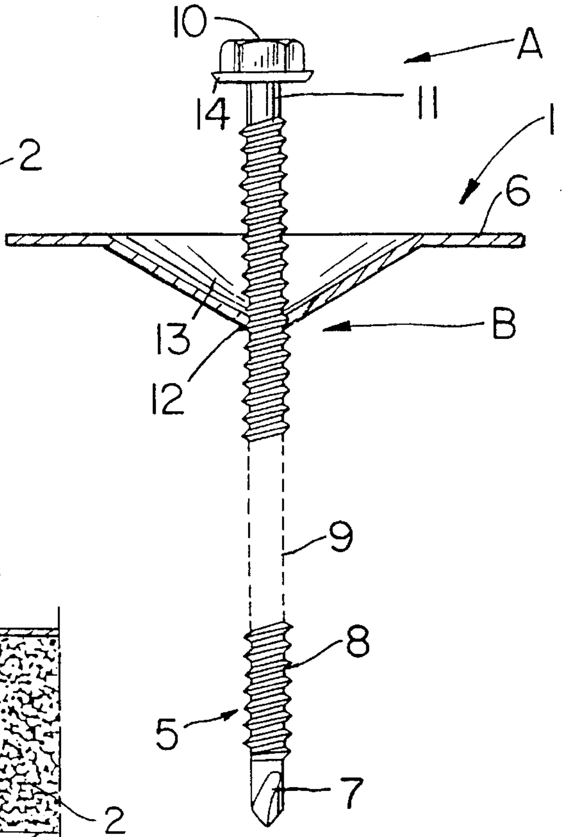
FIG. 3 a fastening element according to the invention, whereby the washer is illustrated in sectioned representation in preassembled condition.
Figure 5:
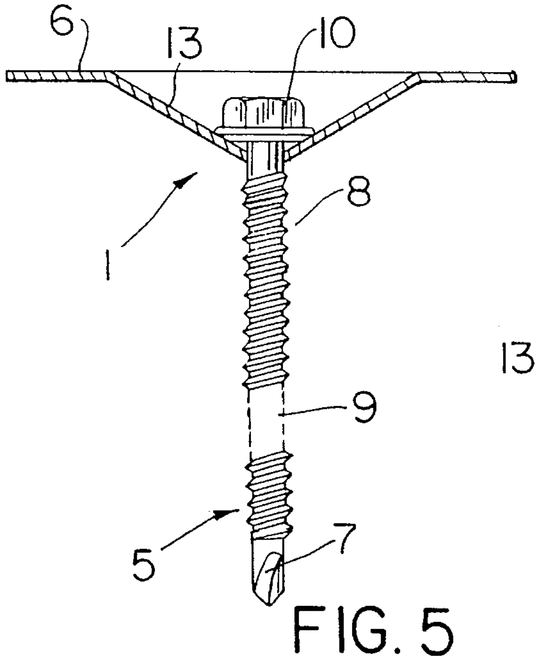
FIG. 5 a fastening element, whereby the washer is illustrated in its final position, which means after the mounting process.
Figure 4:
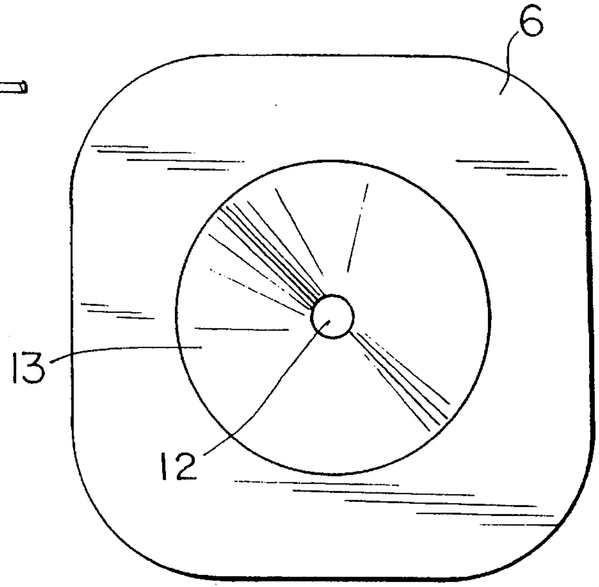
FIG. 4 a top view of the washer.

The aperture (12) in the washer (6) is smaller than the outer diameter of the thread, but at least equally as large as the core diameter of the threaded area of the shaft (9). This is the reason why the screw (5) must be screwed into the aperture (12) of the washer (6) in order to perform the preassembly. The washer (6), at a distance from the screw head (10), is preassembled in such a way that it is secured against axial movement within the threaded area of the screw shaft (9). The preassembled condition is illustrated in FIG. 3. This results in two areas that serve to center the fastening elements for the subsequent mounting process of such a fastening element in association with the corresponding device, namely, the area (A) within the area of the screw head or the collar (14) arranged on said screw head, and the area (B) where the screw (5) engages with its threads (8) into the aperture (12) of the washer (6). A relatively accurate axial alignment of the screw within a corresponding distance between these two areas (A and B) is thus possible during the mounting process.

An advantageous dimensioning of the diameter of the aperture (12) in the washer (6) is obtained in that this diameter at least approximately corresponds with the sum of the core diameter and the height of one thread. This means that two diametrically opposed wall areas of the aperture (12) adjoin the core material of the shaft in the threaded area on the one hand, and an opposing crest of a thread on the other, so that the thread cannot engage into the walls of the aperture but still provide an optimal precautionary measure against axial movement. This furthermore means that the washer is able to slightly tilt relative to the screw axis in order to be able to align the washer in accordance with the screw axis.

Figure 6:
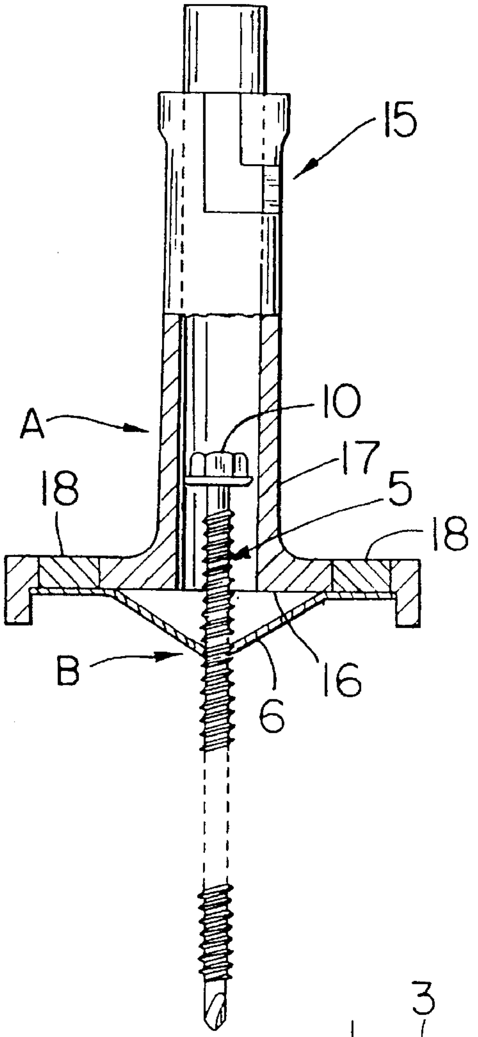
FIG. 6 a partially sectioned representation of a device to screw in a fastening element in which the fastening element is already mounted, and FIG. 7 a different possibility to screw in the fastening elements, whereby the fastening elements are in this particular example at first inserted manually, and the screws are subsequently screwed in by means of the device according to the invention.

Depending on the construction of the device to screw in the fastening element, it is practical if the preassembly of the washer (6) is executed at an identical distance from the screw head (10). The screw head (10) will then always penetrate the device by the same distance, so that identical possibilities exist for an exact axial alignment during the mounting process. FIG. 6 illustrates a device (15) to screw in a fastening element (1). This device has a support surface (16) against which the washer (6) is braced. The device is additionally provided with a receptacle tube (17) into which the end of the screw (5) at which the screw head is located may be inserted. The device (15) may be coupled to a corresponding mounting arrangement provided with a drive element. An axially movable and rotatable tool to take hold of the screw head (10) is in this particular instance provided in the receptacle tube (15). However, this tool is not illustrated in the figure. FIG. 6 in particular illustrates how an exact axial alignment of the fastening element may be obtained by the interaction between the screw head (10) and the washer (6). This again concerns the areas (A and B), previously described in connection with FIG. 3, which make an exact axial alignment of the screw (5) possible.

Permanent magnets (18) are provided in the area of the support surface (16) in order to facilitate the secure retention of the fastening element in the device (15). At least one such permanent magnet (18) is required. However, it is practical if at least two openings that are directed parallel to the axis of the receptacle pipe (17) and radially opposing each other with reference to the receptacle pipe (17) be provided into which these permanent magnets (18) are inserted. This measure ensures that the washer (6) adjoins the support surface (16) with its entire flat surface. With such an arrangement, it is particularly practical if the device (15) consists of plastic or possibly a light alloy in order to obtain the optimum effect of the permanent magnets (18).

Figure 7:
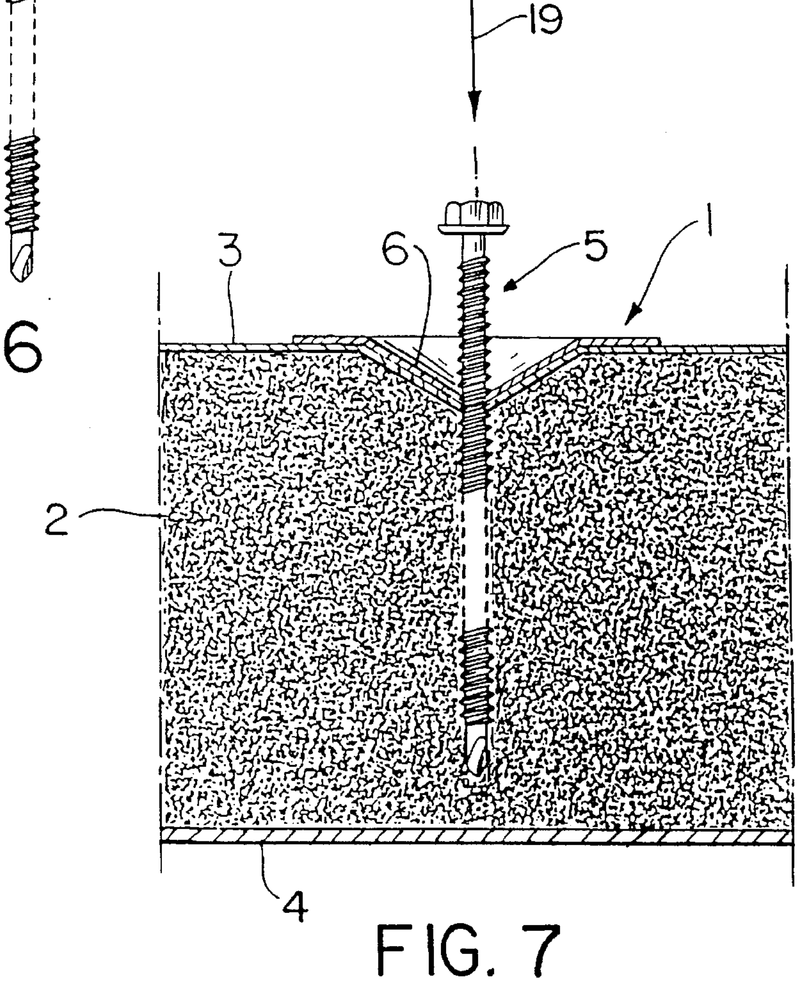

FIG. 6 shows the device in a stage in which the fastening element (1) is inserted into the device (15) and retained in this position. This stage is followed by the mounting process of the fastening element. However, a different way to screw in the fastening element according to the invention is also possible. The permanent magnets (18) of the device (15) would in this particular instance not be required. The mounting of fastening elements is frequently handled in such a way that the fastening elements are within corresponding distances manually pressed into the insulation sheeting (2) through the waterproof sheeting (3). This situation is illustrated in FIG. 7. After the fastening elements have been manually pushed into the insulation sheeting, the device (15) is attached in the direction of the arrow (19), and only the screw (5) must be mounted. The washer (6) fulfills in this particular example also the function of the second guide section (B), so that the washer (6) also adjoins the support surface (16) in this example, but does not have to be retained by the permanent magnets (18). Leaving aside the subsequent mounting process by means of the device according to the invention, it is furthermore practical for the manual insertion of fastening elements if the preassembly of the fastening element is executed in such a way that the washer is arranged at a corresponding distance from the screw head (10). The fastening element is then able to be grasped within the area of the screw head (10) and mounted into the substructure in accordance with this predetermined distance.

The aperture (12) in the washer (6) and the diameter of this aperture were the subject of the previous description. It would naturally also be possible to provide apertures with different shapes than a circular aperture (12). It would thus also be conceivable to construct this aperture (12) with a polygonal form, for example, triangular, square or hexagonal, whereby the corresponding dimensions (diameter dimensions) are with reference to an enveloping circle. The shape of the washer may also be adapted to the most different circumstances, whereby it is basically also conceivable to utilize polygonal as well as round or oval washers. The screw heads (10) can also be constructed in the most different manner, so that it would be possible to provide an internal engagement or any other type of engagement instead of the external hexagonal engagement. In order to facilitate an exact guidance of the screw head (10) in the receptacle pipe (17), it would be conceivable to adapt the collar (14) more accurately to the inner diameter of this receptacle tube (17).

This invention creates a cost-effective fastening system for small and average size flat roofs, whereby the fastening element as well as the device can naturally also be utilized in wall areas or interiors, for example, on ceilings. The invention allows for the premounting of fastening elements on roof surfaces as well as for a reasonable mounting process of the premounted fastening elements.

We claim:

1. Fastening element comprising a screw and a large-surface washer to attach sheeting having a thickness onto a solid substructure, the screw being provided with a drill tip, a shaft with a thread that extends over at least part of its length, and a screw head, the washer being provided with an aperture for the insertion of the screw shaft, the aperture in the washer having a diameter approximately corresponding to the sum of the core diameter and the height of one thread, the washer being preassembled at a distance from the screw head to restrict axial movement of said washer in the threaded area of the screw shaft until there is rotation of said screw in the washer.

2. A fastening element according to claim. 1, further comprising a screw-in device with a support surface for the washer and a receptacle tube to insert the end of the screw at which the screw head is located, the receptacle tube additionally being a receptacle for an axially movable and rotatable tool to grasp the screw head, at least one permanent magnet being provided within the area of the support surface for the washer.

3. A fastening element according to claim 2, wherein the device is formed of one of a plastic and a light metal alloy, and permanent magnets are inserted into two openings having axes directed parallel to a longitudinal axis of the receptacle tube said openings radially oppose each other with reference to the receptacle tube.

* * * * *